United States Patent [19]

Sackmann et al.

[11] Patent Number: 5,728,774

[45] Date of Patent: Mar. 17, 1998

[54] PROCESS FOR THE CONTINUOUS PRODUCTION OF SUPERABSORBENT POLYMERS FROM PAN EMULSIONS

[75] Inventors: Günter Sackmann, Leverkusen; Sergej Schapowalow, Köln; Martin Ullrich, Leverkusen; Helmut Brod, Köln, all of Germany

[73] Assignee: Bayer Aktiengesellschaft, Leverkusen, Germany

[21] Appl. No.: 771,575

[22] Filed: Dec. 20, 1996

[30] Foreign Application Priority Data

Jan. 4, 1996 [DE] Germany ............... 196 00 163.3

[51] Int. Cl.⁶ .................. C08F 8/12; C08F 220/56; C08F 220/44

[52] U.S. Cl. ............... 525/196; 525/198; 525/329.1; 525/329.2; 525/329.3; 525/368; 525/369; 521/31

[58] Field of Search ............... 525/196, 329.1, 525/329.2, 329.3, 369, 368, 198; 521/31

[56] References Cited

U.S. PATENT DOCUMENTS

| | | | |
|---|---|---|---|
| 5,175,193 | 12/1992 | Heller et al. | 521/31 |
| 5,369,132 | 11/1994 | Ito et al. | 521/31 |
| 5,496,980 | 3/1996 | Sackmann et al. | 525/329.2 |

*Primary Examiner*—Irina S. Zemel
*Attorney, Agent, or Firm*—Connolly & Hutz

[57] ABSTRACT

A process for the continuous production of superabsorbent polymers, characterised in that aqueous emulsions of uncross-linked and cross-linked polyacrylonitrile homopolymers and/or copolymers, the polyacrylonitrile concentrations in the reaction mixture being from 10 to 45 w.t. %, are hydrolysed with aqueous alkali hydroxide solutions at 50° to 100° C. in a continuously operating reactor suitable for carrying out highly viscous reactions, and that from the highly viscous gels formed the products in the form of superabsorbent powders are continuously precipitated by means of continuous precipitation using low-boiling monoalcohols, and the use thereof in sanitary articles, as water-storing materials in agriculture or for sheathing electrical cables.

8 Claims, No Drawings

PROCESS FOR THE CONTINUOUS PRODUCTION OF SUPERABSORBENT POLYMERS FROM PAN EMULSIONS

The invention relates to a process for the continuous production of superabsorbent polymers having an extremely high swelling capacity.

Superabsorbent polymers having an extremely high swelling capacity and very high gel strengths are described in Deutsche Offenlegungsschrift U.S. Pat. No. 4,406,951 and in the German Patent Application P-4 429 318.6. These products are obtained by hydrolysis of very freely-divided polyacrylonitrile (PAN) emulsions at temperatures of from 50° to 100° C. and reaction times of from 1 to 2 hours. It is possible to use emulsions of uncross-linked or sparsely cross-linked homopolymers and/or copolymers of acrylonitrile which have been produced in the presence of an anionic polymeric emulsifier. During hydrolysis using aqueous solutions of alkali hydroxides, under the reaction conditions specified in the cited publications there are formed partly hydrolysed homopolymers and/or copolymers of acrylonitrile, wherein from 30 to 80 mol-% of the nitrile groups are converted into carboxylate groups and from 20 to 70 mol-% of the nitrile groups are converted into carbonamide groups and from 0 to 20 mol-% of the nitrile groups remain unchanged. Uncross-linked and cross-linked PAN emulsions yield products having differing free swelling capacities (700 to 1000 g/g in deionised water and 50 to 90 g/g in physiological salt solution) at gel strengths of 30 to 100 g. In general, superabsorbent polymers which have been obtained from uncross-linked PAN emulsions show a high swelling capacity at medium to high gel strength, whereas superabsorbent polymers which have been produced from cross-linked PAN emulsions generally exhibit very high gel strengths at a medium swelling capacity.

By a suitable choice of starting emulsions, it is thus possible to obtain products the properties whereof can be adjusted to the particular field of application.

The superabsorbent polymers have hitherto been produced only by a batch process. A limit is very rapidly encountered when the described process is carried out in conventional stirred tank reactors, owing to the transition, occurring at the onset of hydrolysis, from the PAN emulsion of low viscosity into one in the highly viscous state and swelled by water. Only reaction mixtures having PAN concentrations of <15 wt. % can be used, as otherwise the highly viscous reaction mixture forming during the hydrolysis can no longer be handled and superabsorbers having reproducible properties cannot be produced.

It has been found that superabsorbent polymers from PAN emulsions can be produced continuously and reproducibly from concentrated emulsions when self-cleansing reactors having volumes adequate for a residence time of from 0.5 to 2 hours are used.

Equipment particularly suitable for the production of superabsorbent polymers by hydrolysis of PAN emulsions is of the kind which permits longer residence times accompanied by sufficiently good mixing and good heat transfer, with simultaneous withdrawal of the gaseous ammonia which forms during the hydrolysis. Particularly suitable are so-called "List reactors" (manufacturer: the firm List AG, CH-4422 Arisdorf, Switzerland) containing up to 16.5 $m^3$ free volume, which are constructed as single-shaft or twin-shaft apparatuses and possess special mixing and stripping components both on the shaft and in the reactor housing. These reactors may also be connected one behind the other, thus permitting a great flexibility in use to be achieved.

The invention provides a process for the production of superabsorbent polymers, wherein cross-linked or uncross-linked aqueous polyacrylonitrile emulsions are hydrolysed in a continuously operating, mixing and kneading long-time reactor, by reaction with aqueous alkali hydroxide solutions at from 70° to 100° C., preferably from 85° to 95° C., for from 0.5 to 2 hours, preferably from 1 to 1.5 hours. The concentration of the cross-linked and uncross-linked polyacrylonitrile emulsions in the reaction mixture may be from 10 to 40 wt. %, so that, owing to the weight increase of about 60% brought about by the hydrolysis, the final concentration in the reaction mixture is from 16 to 65 wt. %. Even at the highest possible concentrations, which are limited by the colloidal stability of the aqueous PAN emulsions, the intermixing and the heat transfer of the reaction mixture is totally adequate in the "List" reactor. The residence times in the horizontally disposed reactors can be regulated on the one hand by the construction and the length of the reactor, and on the other hand by the throughput, the degree of filling and the speed of rotation of the shaft. The gaseous ammonia forming in the course of the hydrolysis is removed from the reactor during the reaction via special outlets and subsequent absorption in water or by low-temperature condensation.

After completion of the hydrolysis, the reaction mixture can be continuously passed directly from the List reactor into a precipitation reactor equipped with a high-speed stirrer and containing a low-boiling alcohol, for example, methanol or ethanol. Here the superabsorbent polymer is precipitated as free, freely filterable powder. After the powder has been dried and ground to the required particle size, the superabsorber is in its finished form.

By subsequent heating of the superabsorbent polymers at 150° to 250° C. for 2 to 30 minutes, preferably for 5 to 15 minutes, it is possible markedly to improve their properties in use, in particular the swelling kinetics, that is, the rate of uptake of water and other liquids, as well as the gel strength of the swelled polymers and their capacity to absorb aqueous liquids under pressure. This thermal treatment can be carried out in conventional dryers or kilns (rotary kilns, fluidised bed dryers, disc dryers and infrared dryers).

As an alternative to precipitation with alcohols, the hydrolysate may also be dried directly in a vacuum at temperatures of up to 100° C. and subsequently ground and then graded according to particle size.

The superabsorbent polymers obtainable in such a manner possess excellent properties for practical use. Thus, for example, the products obtained from uncross-linked PAN emulsions achieve the following degrees of swelling: 500 to 800 g/g in deionised water and 40 to 80 g/g in 0.9% NaCl solution. The values for the gel strengths of the swelled products, measured using a "Stevens Texture Analyzer", are between 40 and 66 g. When PAN emulsions sparsely cross-linked by the incorporation of divinylbenzene were used, the measured values of the superabsorbers obtained were within the following ranges: 300 to 500 g/g in deionised water and 30 to 40 g/g in 0.9% NaCl solution; gel strengths: 50 to 80 g.

By subsequent heating of the cross-linked superabsorbent polymers at 150° to 250° C., preferably 170° to 210° C., for 2 to 30 minutes, preferably for 5 to 15 minutes, their properties in use can be further markedly improved. This relates particularly to the swelling kinetics, that is, the rate of uptake of water and other liquids, and the gel strengths of the swelled polymers and their capacity to absorb water and aqueous solutions under pressure.

The superabsorbent polymers obtainable by the process according to the invention are especially suitable for use in the manufacture of articles of hygiene such as, for example, babies' nappies or incontinence articles for adults, as well as for sheathing electrical cables. The products may also be used in agriculture as water-storing materials.

EXAMPLES

Example 1

A reaction mixture consisting of 1905.4 g of a polyacrylonitrile emulsion sparsely cross-linked by the incorporation of 0.75 wt. % of divinylbenzene and having particles of an average diameter of 118 nm and a solids content of 24.2 wt. % together with 2286.4 g of a 7.61 wt. % aqueous NaOH solution, after being preheated to a temperature of 90° C., is pumped into a single-shaft reactor from the firm List, of the Discothem B type, having a free internal volume of 7.1 l. At the beginning of the reaction, the composition of the reaction mixture is as follows: 11.0 wt. % of polyacrylonitrile and 4.15 wt. % of NaOH, the molar ratio of polyacrylonitrile to NaOH being 1:0.5. The subsequent hydrolysis is carried out at 95° C. After a degree of hydrolysis of 44 to 50% has been attained, established by quantitative determination of the ammonia released, the pale yellow reaction mixture, which now has a solids content of 17.9 wt. %, is cooled to 40° to 45° C. This gel-like reaction mixture is then extruded, by means of a helical discharge device, through a perforated plate into a tank equipped with a high-speed mixer, where the neutralisation of the unconsumed sodium hydroxide solution and the precipitation of the product are effected by means of a mixture of hydrochloric acid and ethanol at 20° to 25° C. The volume ratio of ethanol to water in the reaction mixture is 1:1.0 to 1.2.

After the product has been filtered off and dried in the vacuum drying oven at 60° to 70° C., about 735 g of a colourless powder is obtained, which after grinding consists of particles having an average diameter of from 20 to 3000 µm. The product obtained can be graded by means of screens.

To improve its properties in use, the superabsorbent polymer may then be subjected to a thermal treatment at 150° to 200° C.

Determination of the Degree of Swelling 250 mg of the superabsorbent polymer to be investigated is weighed into a 300 ml glass beaker. 250 to 300 ml of distilled water or 50 ml of a 0.9 wt. % NaCl solution is poured over the polymer and the mixture is allowed to stand. After the swelling equilibrium has been attained, the gel obtained is filtered over a filter cloth having a mesh size of 30 µm or over a filter paper and finally weighed. The degree of swelling is then calculated in g/g from the ratio of the final weighed portion to the initial weighed portion. Each determination is carried out three times. The accuracy of measurement is ±5%.

For the product obtained in Example 1 (average particle diameter: 200 to 1000 µm), a degree of swelling of 350 g/g in distilled water and of 38.5 g/g in 0.9% NaCl solution is found.

Measurement of the Gel Strength

Apparatus used: Stevens L.F.R.A. Texture Analyzer

Principle of measurement: a cylindrical or conical test probe is pressed at a preselected speed and measured distance into the gel test specimen. The resulting force is measured in g and registered digitally.

Carrying out of the measurements: 1 g of the specimen to be investigated is swelled for a period of 2 hours in 170 ml of deionised water. The gel is then transferred into 150 ml glass beaker. After the specimen has been tempered at 20° C., the measuring device is adjusted to a speed of 1 mm/sec and a penetration path of 10 mm and is set to the "normal" test programme. The test probe used is the cylindrical test probe having the label TA 3, which has a diameter of 1 inch. At least two measurements are carried out on each specimen.

The gel strength of the product obtained in Example 1 is 74 g.

Examples 2 to 8

The results of Examples 2 to 8 are combined in Table 1.

TABLE 1

| | | | Hydrolysis conditions in the List reactor | | | | | | | Solids content | | Degree of swelling [g/l] | | |
|---|---|---|---|---|---|---|---|---|---|---|---|---|---|---|
| Ex. No. | PAN Emulsion | Mol PAN Emulsion | [C-PAN] in wt. % | Molar ratio PAN:NaOH | Temperature [°C.] | Degree of filling of reactor [vol.-%] | Rate of rotation [rev/min] | Residence time [h] | after hydrolysis (wt. %) | Yield [g] | Water | 0.9% NaCl solution | GS[1] [g] |
| 2 | cross-linked* | 12.0 | 15.0 | 1:0.5 | 95 | 55 | 20 | 2.0 | 24.3 | 1.013 | 254 | 34.5 | 77 |
| 3 | cross-linked* | 15.0 | 20.0 | 1:0.5 | 95 | 51.3 | 15 | 2.5 | 32.0 | 1.240 | 313 | 37.5 | 55 |
| 4 | cross-linked* | 20.55 | 19.9 | 1:0.525 | 95 | 72.1 | 20 | 2.0 | 32.7 | 1.721 | 525 | 55 | 36 |
| 5 | cross-linked* | 20.55 | 19.9 | 1:0.525 | 95 | 72.1 | 20 | 2.0 | 32.8 | 1.722 | 520 | 53.5 | 35 |
| 6 | cross-linked* | 20.55 | 19.9 | 1:0.525 | 95 | 72.1 | 20 | 2.0 | 32.7 | 1.724 | 252 | 35.6 | 80 |
| 7 | un-cross-linked** | 16.0 | 17.06 | 1:0.5 | 95 | 64.6 | 20 | 2.0 | 27.5 | 1.330 | 800 | 70.0 | 16 |
| 8 | un-cross-linked** | 16.0 | 17.06 | 1:0.5 | 95 | 64.6 | 20 | 2.0 | 27.7 | 1.340 | 532 | 45.5 | 32 |

TABLE 1-continued

| | | | Hydrolysis conditions in the List reactor | | | | | | Solids content | Degree of swelling [g/l] | | |
|---|---|---|---|---|---|---|---|---|---|---|---|---|
| Ex. No. | PAN Emulsion | Mol PAN Emulsion | [C-PAN] in wt. % | Molar ratio PAN:NaOH | Temperature [°C.] | Degree of filling of reactor [vol.-%] | Rate of rotation [rev/-min] | Residence time [h] | after hydrolysis (wt. %) | Yield [g] | Water | 0.9% NaCl solution | GS[1] [g] |

*Cross-linked PAN emulsion particle size: 118 nm; solids content: 24.2 wt. %; cross-linking agent: 0.75 wt. % divinylbenzene, referred to monomer
**Uncross-linked PAN emulsion particle size: 90 nm; solids content: 19.9 wt. %; [η] value in DMF: 7.3 dl/g
[1]GS = gel strength The degrees of swelling of the products are in distilled water and in 0.9% NaCl solution and the gel strengths of the products at particle sizes of 200 to 1000 μm are listed in the final three columns of the Table. Reaction mixtures containing increasing initial concentrations of polyacrylonitrile were used for Examples 2 to 4.

Example 5

In this Example, the hydrolysis was carried out under conditions identical to those in Example 4. The product was precipitated using methanol at a volume ratio of methanol to water of 1:0.5 to 0.55 at a temperature of 20° to 25° C.

Example 6

Here the hydrolysis was carried out under conditions identical to those in Examples 4 and 5. After the hydrolysis, the reaction mixture (gel) was dried directly in a vacuum at a temperature of 65° to 70° C. to a residual moisture content of about 15 wt. %. The product was then ground, and the final stage carried out prior to drying was the neutralisation of the product using formic acid in a methanol/water mixture. The weight ratio of the product to methanol and water was 1:2.2:1.25.

Example 7

An uncross-linked PAN emulsion was used as the starting product for the hydrolysis in the List reactor. The concentration of PAN in the reaction mixture was 17.06 wt. %. The hydrolysis and the precipitation of the product were carried out under conditions identical to those in Example 1.

Example 8

The conditions for hydrolysis corresponded to those of Example 7. The reaction mixture obtained was dried without precipitation. The grinding and the subsequent neutralisation were carried out in a methanol/water mixture, as described in Example 6.

In Table 2 are combined the results of measurements of the gel strengths and the degrees of swelling after thermal treatment of some selected products listed above in Table 1 (Examples 4 and 7).

| Example No. | Thermal treatment (t = 15 min) | Degree of swelling [g/g] | | Gel strength [g] |
|---|---|---|---|---|
| | | in water | in 0.9% NaCl solution | |
| 4 | — | 525 | 53.0 | 36 |
| | 165° C. | 245 | 37.7 | 74 |
| 7 | — | 800 | 70.0 | 16 |
| | 180° C. | 335 | 40.5 | 63 |

We claim:

1. A process for the continuous production of superabsorbent polymers, which comprises hydrolyzing a reaction mixture comprising an aqueous emulsion of polyacrylonitrile homopolymers and/or copolymers, the reaction mixture containing 10–45% by weight of polyacrylonitrile, with aqueous alkali hydroxide at 50 to 100 degrees C, the reaction being carried out in a high viscosity reactor, to form a highly viscous gel, and recovering the superabsorbent polymer from the gel as a powder.

2. The process of claim 1, wherein the high viscosity reactor provides mixing and kneading.

3. The process of claim 1, carried out a temperature of 70 to 100 degrees C.

4. The process of claim 1, wherein the hydrolysis is carried out for from 0.5 to 2 hours.

5. The process of claim 1, wherein the polyacrylonitrile polymer or copolymer is uncrosslinked.

6. The process of claim 1, wherein the polyacrylonitrile polymer or copolymer is crosslinked.

7. The process of claim 1, further comprising thermal treatment.

8. The process of claim 1, wherein the gel is continuously precipitated with low-boiling monoalcohols.

* * * * *